(12) United States Patent
Takahashi et al.

(10) Patent No.: US 7,492,573 B2
(45) Date of Patent: Feb. 17, 2009

(54) ELECTROCHEMICAL DEVICE

(75) Inventors: Tetsuya Takahashi, Tokyo (JP); Yoshihiko Ohashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/390,072

(22) Filed: Mar. 28, 2006

(65) Prior Publication Data

US 2006/0221552 A1    Oct. 5, 2006

(30) Foreign Application Priority Data

Mar. 30, 2005   (JP)   ............................ P2005-098524

(51) Int. Cl.
*H01G 9/02* (2006.01)
(52) U.S. Cl. .................. 361/512; 361/502; 361/503
(58) Field of Classification Search ............... 361/502, 361/503, 512
See application file for complete search history.

(56) References Cited

U.S. PATENT DOCUMENTS 5,362,581 A * 11/1994 Chang et al. ................. 429/249
6,525,923 B2 * 2/2003 Ishikawa et al. ............. 361/508
2003/0180662 A1   9/2003 Tsukuda et al.
2005/0032451 A1   2/2005 Kritzer et al.
2007/0247785 A1 * 10/2007 Kobayahsi et al. .......... 361/502

FOREIGN PATENT DOCUMENTS

| JP | A 10-256088 | 9/1998 |
| JP | A 2004-14592 | 1/2004 |
| TW | 1227066 | 10/1991 |
| TW | 00219377 | 1/1994 |
| TW | 00331669 | 5/1998 |
| TW | 2007405604 | 9/2007 |

* cited by examiner

*Primary Examiner*—Eric Thomas
(74) *Attorney, Agent, or Firm*—Oliff & Berridge, PLC

(57) ABSTRACT

In an electrochemical device comprising a multilayer body having a separator and a pair of electrodes disposed so as to hold the separator therebetween, and an electrolyte infiltrated in the multilayer body; the electrodes contain an active material particle; the separator is made of a nonwoven fabric having an average fiber diameter Df of 0.1 to 1.0 μm; T≧5 μm and T/Df≧20, where T is the thickness of the separator; and Dp<T, where Dp is the average particle size of the active material particle.

1 Claim, 2 Drawing Sheets

Fig.2

| | SEPARATOR | | | | ACTIVE MATERIAL PARTICLE SIZE Dp (μm) | RESULTS | | |
|---|---|---|---|---|---|---|---|---|
| | MATERIAL | THICKNESS T(μm) | FIBER DIAMETER Df(μm) | T/D (−) | | LEAKAGE CURRENT (μA) | ESR (Ω) | REMARKS |
| EXAMPLE 1 | POLYACRYLONITRILE | 13 | 0.4 | 32.5 | 4 | 0.2 | 5.4 | - |
| EXAMPLE 2 | POLYACRYLONITRILE | 20 | 1.0 | 20 | 4 | 0.1 | 5.9 | - |
| EXAMPLE 3 | POLYACRYLONITRILE | 5 | 0.1 | 50 | 4 | 0.4 | 5.1 | - |
| EXAMPLE 4 | POLYPROPYLENE | 20 | 1.0 | 20 | 4 | 0.1 | 19.7 | - |
| COMPARATIVE EXAMPLE 1 | POLYACRYLONITRILE | 2 | 0.1 | 20 | 4 | - | - | SEPARATOR BROKEN |
| COMPARATIVE EXAMPLE 2 | POLYACRYLONITRILE | 10 | 1.0 | 10 | 4 | 3.3 | 5.3 | - |
| COMPARATIVE EXAMPLE 3 | POLYACRYLONITRILE | 13 | 0.4 | 32.5 | 25 | - | - | SHORT CIRCUIT BETWEEN ELECTRODES |

ELECTROCHEMICAL DEVICE

BACKGROUND OF THE INVENTION

1. Field of the Invention

The present invention relates to an electrochemical device.

2. Related Background Art

An electric double layer capacitor comprises a multilayer body having a separator and a pair of electrodes disposed so as to hold the separator therebetween; an outer bag containing the multilayer body; and an electrolyte infiltrated in the multilayer body.

The separator is an insulating, porous material for securing ion circulation while preventing the electrodes from coming into contact with each other (see, for example, Japanese Patent Application Laid-Open No. H 10-256088).

SUMMARY OF THE INVENTION

Electrochemical devices such as the above-mentioned electric double layer capacitor have been demanded to further reduce their thickness. For thinning an electrochemical device without reducing its capacity and the like, it seems preferable to make the separator thinner. Nonwoven fabrics have often been in use as the separator.

However, studies conducted by the inventors have proved that, when a conventional separator made of a nonwoven fabric is thinned to 20 µm or less, for example, uniformity deteriorates in in-plane directions of the separator, so that sparse parts are likely to occur, thereby increasing a leakage current between the electrodes, whereas active material particles desorbed from the electrodes may enter pinholes in the separator and cause a short circuit between the electrodes.

In view of the problem mentioned above, it is an object of the present invention to provide an electrochemical device which is thinner, shorter in leakage current, and less likely to cause a short circuit between electrodes as compared with conventional devices.

The present invention provides an electrochemical device comprising a multilayer body having a separator and a pair of electrodes disposed so as to hold the separator therebetween, and an electrolyte infiltrated in the multilayer body. The electrodes contain an active material particle. The separator is made of a nonwoven fabric having an average fiber diameter Df of 0.1 to 1.0 µm. $T \geq 5$ µm and $T/Df \geq 20$, where T is the thickness of the separator. $Dp < T$, where Dp is the average particle size of the active material particle.

Since $T/Df \geq 20$, there are about 20 fibers in the thickness direction of the separator. This improves the uniformity in in-plane directions of the separator, thereby reducing the leakage current.

Since the nonwoven fabric has an average fiber diameter Df of 0.1 to 1.0 µm, a separator thinner than conventional ones can be provided even when $T/Df > 20$.

Since the thickness $T \geq 5$ µm, the separator has a sufficient strength.

Since $Dp < T$, the electrodes are less likely to short-circuit even when active material particles dropped out of the electrodes enter pinholes inevitably formed in the separator made of the nonwoven fabric.

When the separator has a thickness T of 20 µm or less here, the electrochemical device can be provided sufficiently thinner than conventional ones.

It will be preferred if the separator has a melting point of 160° C. or higher, since this allows multilayer body to be vacuum-dried in a short time at a high temperature of about 150° C.

The present invention provides an electrochemical device which is thinner, shorter in leakage current, and less likely to cause a short circuit between electrodes as compared with conventional devices.

BRIEF DESCRIPTION OF THE DRAWINGS

FIG. 2 is a table showing characteristics of separators and active material particles and characteristics of resulting electric double layer capacitors in Examples 1 to 4 and Comparative Examples 1 to 3.

DESCRIPTION OF THE PREFERRED EMBODIMENTS

Figure 1:
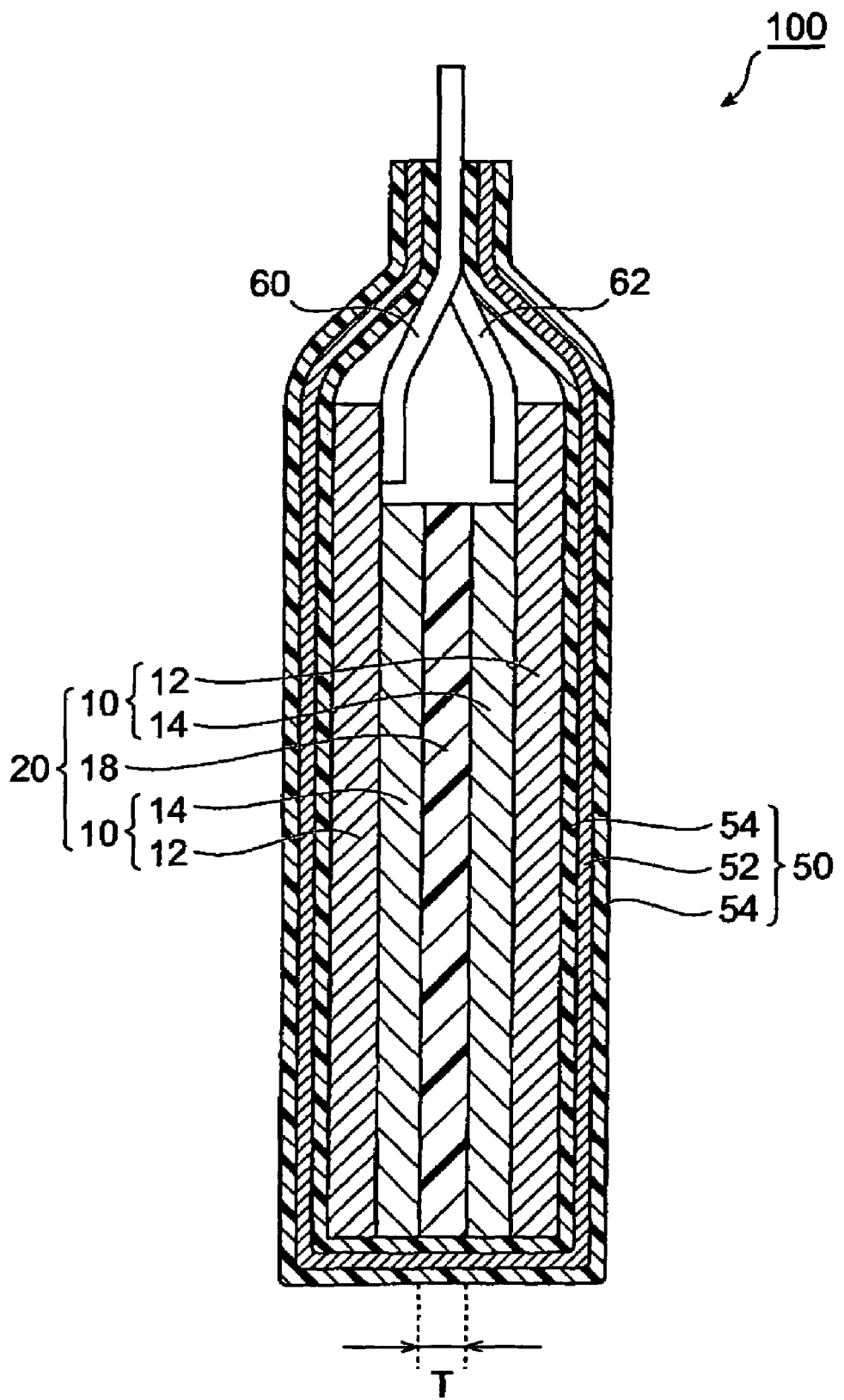
FIG. 1 is a sectional view showing the electric double layer capacitor in accordance with an embodiment.

As an example of the electrochemical device in accordance with an embodiment, an electric double layer capacitor will be explained.

FIG. 1 is a sectional view showing the electric double layer capacitor 100 in accordance with this embodiment.

The electric double layer capacitor (electrochemical device) 100 mainly comprises a multilayer body 20; an outer bag 50 containing the multilayer body 20; and a pair of leads 60, 62 connected to the multilayer body 20.

In the multilayer body 20, a pair of electrodes 10 are arranged so as to oppose each other with a separator 18 interposed therebetween. Each electrode 10 comprises an active material containing layer 14 provided on a collector 12. The active material containing layers 14, 14 are in contact with both sides of the separator 18, respectively. The leads 60, 62 are connected to respective end parts of the collectors 12, 12, whereas end parts of the leads 60, 62 extend to the outside of the outer bag 50.

Each collector 12 is made of a metal foil such as aluminum foil, for example.

Each active material containing layer 14 is a layer containing an active material particle, and is bonded to a surface of its corresponding collector 12. The active material containing layer 14 is formed by a mixture of an active material particle and a binder, for example. As the active material particle, acetylene black, graphite, black lead, and activated carbon, for example, may be used selectively or in mixtures of any ratios. As the binder, fluorine resins such as polyvinylidene fluoride (PVDF), for example, may be utilized. Let Dp be the average particle size of the active material particle. The average particle size Dp can be measured by a laser diffraction/scattering method, for example, in a powder state. In a state formed with the active material containing layer, on the other hand, the number of grain boundaries of active material particles existing within a given length in an electron micrograph of a surface or cross section may be determined, for example, and the average particle size Dp can be calculated therefrom. The average particle size Dp is preferably on the order of 2 to 5 µm, for example.

The separator 18 is formed from a nonwoven fabric. The nonwoven fabric is formed from fibers having an average fiber diameter Df and a thickness T. The average fiber diameter Df can be measured by an electron microscope. Though not restricted in particular, the material for fibers is preferably a resin, examples of which in particular are resins having a melting point of 160° C. or higher such as polyacrylonitrile (PAN), polyesters like polyethylene terephthalate (PET) and polyethylene naphthalate (PEN), polyamide (PA), and polyamide imide (PAI).

In this embodiment, in particular, the average fiber diameter Df is 0.1 to 1.0 μm, whereas T satisfies T≧5 μm and T/Df>20. Also, Dp<T concerning the Dp of the active material particle and the thickness T of the separator 18.

The multilayer body 20 is impregnated with an electrolyte. The electrolyte is mainly infiltrated in the separator 18 and the active material containing layers 14 in the electrodes 10.

Without being limited in particular, electrolytes employed in known electrochemical devices such as electric double layer capacitors (e.g., aqueous electrolyte solutions and nonaqueous electrolyte solutions using organic solvents) can be used. Preferred in particular are nonaqueous electrolytes, typical examples of which include solutions of quaternary ammonium salts such as tetraethylammonium tetrafluoroborate in organic solvents such as propylene carbonate, diethylene carbonate, and acetonitrile.

The outer bag 50 seals the multilayer body 20 and the electrolyte therewithin. The outer bag 50 is not limited in particular as long as it can prevent the electrolyte from leaking to the outside and moistures and the like from entering the electric double layer capacitor 100. For example, a metal laminate film in which a metal foil 52 is coated with synthetic resin films 54 from both sides as shown in FIG. 1 can be used as the outer bag 50. An aluminum foil and a film such as polypropylene can be used as the metal foil and the synthetic resin film, for example.

The leads 60, 62 are formed from a conductive material such as aluminum.

Since T/Df≧20 in the electric double layer capacitor 100, there are about 20 fibers in the thickness direction of the separator 18. This improves the uniformity in in-plane directions of the separator 18, thereby reducing the leakage current between the electrodes 10.

Since the nonwoven fabric has an average fiber diameter Df of 0.1 to 1.0 μm, the separator 18 can be realized thinner than conventional ones even when T/Df>20. In particular, the separator can easily attain a thickness T of 20 μm or less, whereby an electrochemical device which is sufficiently thinner than conventional ones can be provided. Therefore, a higher energy density can be achieved. The separator having such a fiber diameter Df is favorable because of its high liquid retention, which can lower its internal resistance.

Since T≧5 μm, the separator 18 has a sufficient strength and thus is hard to break during its manufacture, use, and the like.

The separator 18 made of a nonwoven fabric inevitably has pinholes penetrating therethrough in its thickness direction, whereby active material particles desorbed from the active material containing layer 14 may enter the pinholes. In this embodiment, however, the average particle size Dp of the active material particle satisfies Dp<T, a short circuit is less likely to occur between the electrodes 10, 10, i.e., between the active material containing layers 14, 14, even when the active material particles dropped out of the electrodes enter the pinholes of the separator 18.

It will be sufficient if the electric double layer capacitor 100 is manufactured in the following manner. First, the multilayer body 20 having the leads 60, 62 connected thereto, the outer bag 50, and the electrolyte are prepared. The multilayer body 20 may be manufactured by a known method using materials satisfying the above-mentioned conditions. Each of the multilayer body 20 and the outer bag 50 is sufficiently dried. For example, it will be preferred if they are heated in the air and then heated in vacuum and so forth, so that their moistures are sufficiently reduced. Here, the melting point of the nonwoven fabric is preferably 160° C. or higher in the separator 18, since this allows multilayer body 20 to be vacuum-dried in a short time at a high temperature of about 150° C. The reduction in moisture can improve reliability in an electrochemical device using a nonaqueous electrolyte.

Subsequently, the multilayer body 20 is accommodated in the outer bag 50, and the electrolyte is dropped into the multilayer body 20. Thereafter, the outer bag 50 is sealed, whereby the electric double layer capacitor is completed.

Without being restricted to the mode mentioned above, the electric double layer capacitor 100 may be one in which a number of multilayer bodies 20 are laminated, for example.

Though the above-mentioned embodiment relates to an electric double layer capacitor, similar operations and effects are attained in electrochemical devices such as primary and secondary batteries as long as they have a multilayer body comprising a separator held between electrodes and an electrolyte infiltrated in the multilayer body.

EXAMPLE 1

In the following manner, an electric double layer capacitor of Example 1 was made.

Making of Electrode

Activated carbon as an active material, carbon black as a conductive auxiliary agent, and PVDF as a binder were mixed such that the ratio of active material/conductive auxiliary agent/binder=87:3:10, and the resulting mixture was kneaded with N-methylpyrrolidone added thereto, so as to prepare a coating material. The average particle size of the activated carbon was 4 μm.

After the coating material was applied onto one face of an etching aluminum foil by doctor blading, the aluminum foil was dried in the air for 30 minutes at 100° C. The resulting product was extended by roll pressing. Then, the aluminum foil centered at the area formed with the coating film was punched out into a piece of 7.8×7.8 mm with a tab part, so as to yield an electrode for an electric double layer capacitor.

Making of Separator

A nonwoven fabric made of polyacrylonitrile having a thickness T of 13 μm and a fiber diameter Df of 0.4 μm was punched out into a piece of 8.2×3.2 mm, so as to yield a separator.

Making of Cell

The separator was held between two punched-out electrodes from both sides, so as to yield a multilayer body. A lead made of aluminum was welded to the tab part of the multilayer body by ultrasonic welding. The multilayer body having the lead attached thereto was held with an aluminum laminate film folded into two parts, and two sides thereof including a lead part were sealed under heat and pressure. Then, the aluminum laminate bag containing the multilayer body was dried for 12 hours in a vacuum dryer at 160° C. Then, with a polycarbonate solution containing 1.0 mol/L of TEA-BF$_4$ added into the bag, the opening was sealed under reduced pressure, so as to yield the electric double layer capacitor of Example 1.

EXAMPLE 2

In Example 2, an electric double layer capacitor was obtained as in Example 1 except that a nonwoven fabric made of polyacrylonitrile having a thickness T of 20 μm and a fiber diameter D of 1 μm was used as the separator.

EXAMPLE 3

In Example 3, an electric double layer capacitor was obtained as in Example 1 except that a nonwoven fabric made of polyacrylonitrile having a thickness T of 5 μm and a fiber diameter D of 0.1 μm was used as the separator.

EXAMPLE 4

In Example 4, an electric double layer capacitor was obtained as in Example 1 except that a nonwoven fabric made of polypropylene having a thickness T of 20 μm and a fiber diameter D of 0.1 μm was used as the separator.

Comparative Example 1

In Comparative Example 1, an electric double layer capacitor was obtained as in Example 1 except that a nonwoven fabric made of polyacrylonitrile having a thickness T of 2 μm and a fiber diameter D of 0.1 μm was used as the separator.

Comparative Example 2

In Comparative Example 2, an electric double layer capacitor was obtained as in Example 1 except that a nonwoven fabric made of polyacrylonitrile having a thickness T of 10 μm and a fiber diameter D of 1.0 μm was used as the separator.

Comparative Example 3

In Comparative Example 3, an electric double layer capacitor was obtained as in Example 1 except that the average particle size of the active material particle was 25 μm.

Each of the electric double layer capacitors in accordance with the Examples and Comparative Examples was charged for 12 hours at a voltage of 2.7 V in an atmosphere at 85° C., and then was discharged in an atmosphere at 25° C. Subsequently, a part of the outer casing was perforated in a dry environment, and beat sealing was effected again under reduced pressure, so as to let out the. gas stored therewithin. Then, a voltage of 2.1 V was applied for 1 hour in the atmosphere at 25° C., and the current flowing through the electric double layer capacitor after 1 hour therefrom was measured as a leakage current. Thereafter, discharging was performed at 25° C., and equivalent series resistance (ESR) was measured. Each value was an average of five electric double layer capacitors. FIG. 2 shows separator characteristics and electric double layer capacitors and results of measurement of electric double layer capacitors concerning the Examples and Comparative Examples.

In Examples 1 to 4, the leakage current was 0.1 to 0.4 μA, which was very small. In Comparative Example 1, by contrast, the separator was broken, which seems to be because of a shortage of thickness in the separator, so that it failed to function as an electric double layer capacitor. In Comparative Example 2, on the other hand, the leakage current was 3.3 μA, which was large. Comparative Example 3 exhibited a cell with a very large leakage current, whereby the dropped-out active material seems to have entered pinholes in the separator and caused a minute short circuit.

While Examples 1 to 3 yielded a sufficiently low equivalent series resistance of 5.1 to 5.9 Ω, Example 4 exhibited a slightly higher equivalent series resistance of 19.7 F. This seems to be because of the fact that the separator was a nonwoven fabric made of polypropylene, which melted at the time of vacuum drying at 160° C. and partly blocked openings of the nonwoven fabric.

What is claimed is:

1. An electrochemical device comprising:
    a multilayer body having a separator;
    a pair of electrodes disposed so as to hold the separator therebetween;
    an electrolyte infiltrated in the multilayer body;
    wherein the electrodes contain an active material particle;
    wherein the separator is made of a nonwoven fabric consisting of polyacrylonitrile fiber having an average fiber diameter $Df$ of 0.1 to 1.0 μm;
    wherein $T \geq 5$ μm and $T/Df \geq 20$, where $T$ is the thickness of the separator; and
    wherein $Dp < T$, where $Dp$ is the average particle size of the active material particle.

* * * * *